Feb. 18, 1958     C. H. THOMPSON     2,823,774
COMBINED THROTTLE AND BRAKE CONTROL FOR AUTOMOBILES
Filed April 15, 1954     2 Sheets-Sheet 1
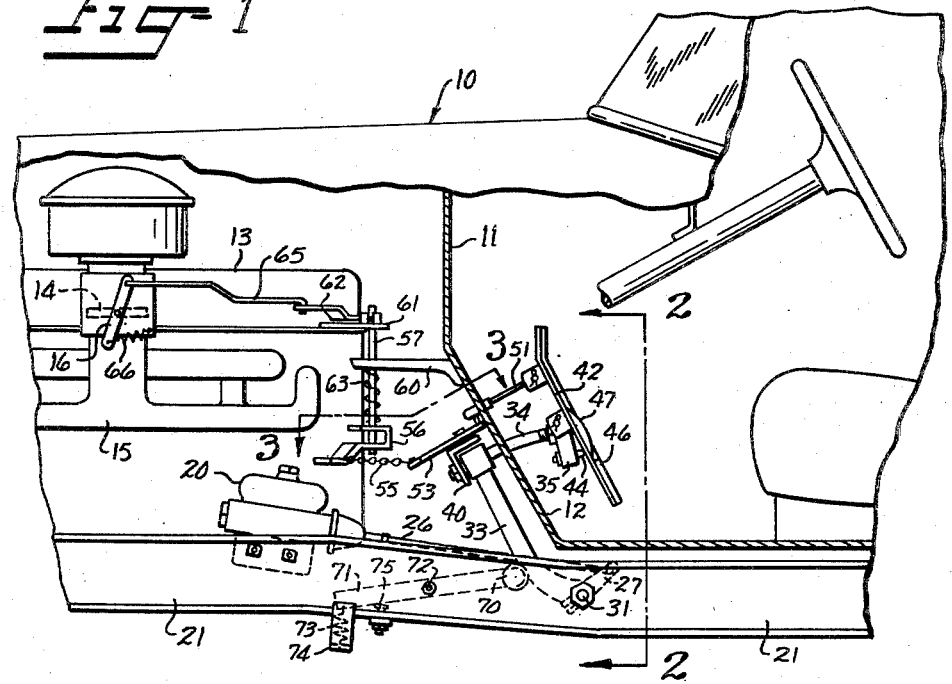
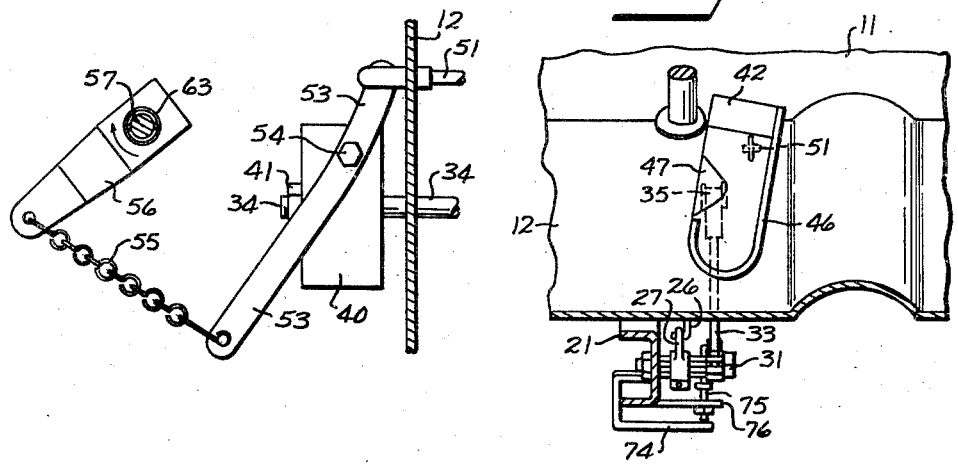
INVENTOR:
CLAUDE H. THOMPSON
BY *Eaton + Bell*
ATTORNEYS.

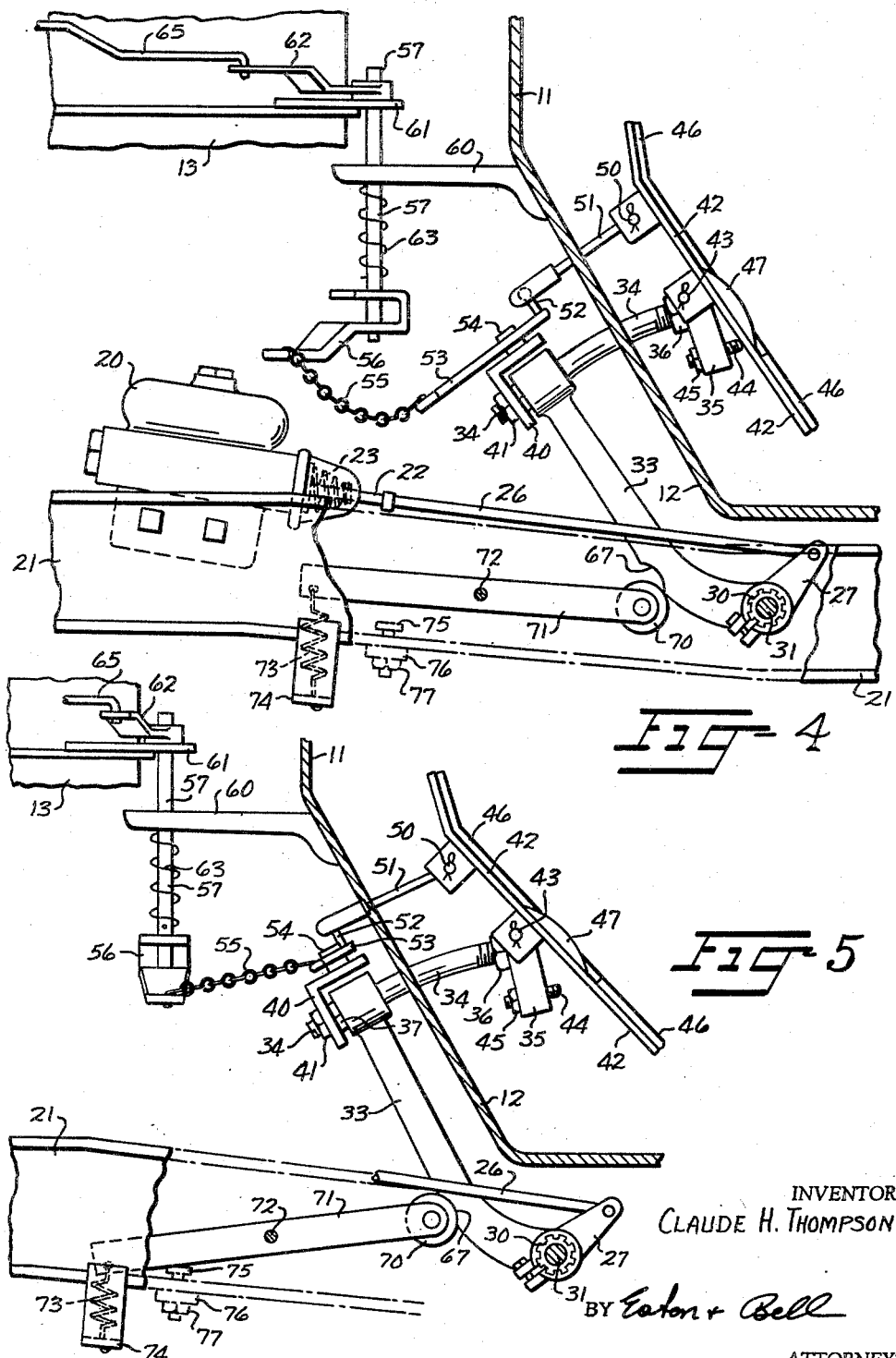

United States Patent Office 2,823,774
Patented Feb. 18, 1958

2,823,774

COMBINED THROTTLE AND BRAKE CONTROL FOR AUTOMOBILES

Claude H. Thompson, Shelby, N. C.

Application April 15, 1954, Serial No. 423,285

8 Claims. (Cl. 192—3)

This invention relates to throttle and brake controls for automotive vehicles and, more especially, to improved means for applying and releasing the brakes combined with means for opening and closing the throttle or butterfly valve of the carburetor.

It is an object of this invention to provide improved combined throttle and brake controls for automobiles which have a minimum of parts and can thereby be manufactured and installed economically as compared to similar devices heretofore in use.

It is another object of this invention to provide improved combined throttle and brake controls for automobiles, wherein at least a pair of such controls are operatively associated with a single foot-operated element for actuation independently of each other and wherein an automatically releasable restraining means normally prevents the brakes from being actuated when the throttle is opened and wherein a slightly above normal pressure on the foot-operated element will actuate the brakes.

It is another object of this invention to provide combined throttle and brake controls of the character last described and wherein application of the brakes automatically overrides the operation of the throttle. As a matter of fact, the overriding mechanism interposed between the brake control and the throttle control is such as to selectively permit the throttle to remain open or closed to idling position whenever the brakes are actuated.

Some of the objects of the invention having been stated, other objects will appear as the description proceeds, when taken in connection with the accompanying drawings in which—

Figure 1 is a fragmentary elevation of a portion of an automobile, partially in section, showing the improved combined throttle and brake controls installed thereon;

Figure 2 is a fragmentary elevation, partially in section, taken substantially along line 2—2 in Figure 1;

Figure 3 is an enlarged developed fragmentary plan view showing the overriding means interposed between the brake and throttle controls and being taken substantially along line 3—3 in Figure 1;

Figure 4 is an enlarged view similar to the central portion of Figure 1 showing the position occupied by the various parts when the brakes are applied;

Figure 5 is a fragmentary view similar to Figure 4 but showing the position occupied by the various parts when the throttle is actuated and the brakes are released.

Referring more specifically to the drawings, the numeral 10 broadly designates any suitable automotive vehicle, such as an automobile or truck provided with a fire wall 11 and foot board 12 separating the driver's compartment from the engine compartment. A suitable internal combustion engine 13 is provided in the engine compartment and has a throttle valve or butterfly valve 14 operatively associated with an intake manifold 15 of the engine 13. A fuel valve lever 16 is disposed exteriorally of the manifold 15 for actuation by the improved throttle mechanism to be later described.

As best shown in Figures 1 and 4, the automobile or automotive vehicle 10 also includes the usual hydraulic or fluid braking system which comprises a master cylinder 20 fixed to the frame or chassis 21 of the automotive vehicle 10. From one end of cylinder 20 a piston rod 22 extends. The piston rod 22 is rockably connected to the usual piston, not shown, disposed within the master cylinder 20, and is normally urged rearwardly by a suitable spring 23 (Figure 4). The cylinder 20 is connected to the brakes of the vehicle in a conventional and well known manner and a further illustration and description thereof is thus deemed unnecessary.

As is usually the case, the brakes of the vehicle are applied when the piston rod 22 is moved inwardly relative to the master cylinder 20 and they are released when the piston rod 22 is moved outwardly or rearwardly.

The usual type of brake pedal may be employed with the usual type of connections between the brake pedal and the piston rod 22. However, it is preferred that the brake pedal is relocated so that it is disposed in closer proximity to the throttle control of the vehicle than is normally the case. Thus, the piston rod 22 has one end of a link 26 connected thereto. The other end of the link 26 is pivotally connected to a crank arm 27. The crank arm 27 is mounted on a splined sleeve 30 loosely mounted on a stud 31 fixed to the frame 21 of the vehicle 10. Also fixed on the splined sleeve 30, is the lower end of a brake pedal lever 33 which is generally of the same shape or configuration as conventional brake pedal levers currently in use, but which is modified somewhat for use with the present invention, as will be later described. The brake pedal lever is normally urged rearwardly by the spring 23 (Figure 4).

Except as otherwise stated, the parts heretofore described are the usual parts of an automotive vehicle with which the present invention is adapted to be associated.

The brake pedal lever 33 curves forwardly and upwardly from the splined sleeve 30 and then extends upwardly, and the enlarged upper end thereof is penetrated by the reduced, threaded front end of a curved arm 34 forming a rearward extension which loosely penetrates the foot board 12 and has a block 35 fixed on its other or rear end and depending therefrom.

The upper end of the block 35 may be threadably mounted on the rear end of the arm 34 and locked in position by means of a lock nut 36. The reduced front or lower end of the arm 34 may be secured in the enlarged upper end of the brake pedal lever 33 by means of a nut 37. One leg of an angle bracket 40 is also secured on the reduced front end of the arm 34 by means of a nut 41. The purpose of the angle bracket 40 will be later described.

The medial portion of a foot-pedal 42 is pivotally connected to the upper portion of block 35, as at 43, and the inner surface of the foot-pedal 42 is adapted to, at times, engage an adjustable abutment 44 shown in the form of an adjustment screw threadably penetrating the lower portion of the block 34 and being locked therein by means of a lock nut 45. A suitable rib or flange 46 may be provided on the pedal 42 which ridge 46 may extend along one side of the pedal 42 from its upper end thereof and then curve around the lower edge thereof and terminate substantially short of the upper end of the pedal at the other side thereof. It is also preferable that the foot-pedal 42 is provided with a raised portion 47 intermediate its ends and adjacent its left-hand side, as shown in Figure 2, for supporting the arch of the foot of the operator, if desired.

It will be observed in Figures 1, 4 and 5 that the foot-pedal 42 extends upwardly and forwardly at an angle substantially beyond the pivot point 43 and is pivotally connected, as at 50, to one end of a throttle operating link 51. The throttle-operating link 51 loosely penetrates the foot board 12 of the vehicle 10 and its other end is universally connected to an upwardly projecting pin 52 carried by one end of a second lever 53. The lever 53 is pivotally connected intermediate its ends, as at 54, to the angle bracket 40 heretofore described (Figures 1, 3, 4 and 5).

It will be observed in Figure 3 that the portion of the lever 53 between the corresponding end of the link 51 and the pivot point 54 thereof is substantially less than the portion of the lever extending beyond the pivot point 54 relative to the link 51, and the end of the lever 53 remote from the link 51 has one end of a pliable element 55 connected thereto, which pliable element is shown in the form of a chain in Figures 1, 3, 4 and 5. The other end of the chain or link 55 is connected to one end of a crank arm 56 whose other end is fixed on the lower end of an upright shaft or rod 57. The provision of the pliable element 55 between the lever 53 and the crank arm 56 is an important feature of the present invention and constitutes the primary element of the overriding means provided between the throttle and brake controls whenever the brake pedal lever is depressed.

The upright shaft or rod 57 is suitably journaled in a bracket 60 which projects rearwardly and is suitably secured to the foot board 12. The upper portion of the rod 57 is also journaled in a plate, bracket or bearing member 61 suitably supported on the engine 13. The upper end of the rod or shaft 57 has a crank arm 62 fixed thereon which bears against the upper surface of the bearing member 61 and thereby supports the shaft 57. The portion of the shaft 57 between the bearing bracket 60 and the lever 56 is surrounded by a torsion spring 63 whose upper end is suitably connected to the bracket 60 and whose other end is fixed to the shaft 57 and thereby tends to rotate the shaft 57 in a clockwise direction in Figure 3.

The crank arm 62 has one end of a link 65 pivotally connected thereto whose other end is pivotally connected to one end of the fuel valve lever or throttle lever 16. The throttle lever 16 is normally urged in a counterclockwise direction in Figure 1 by a suitable spring 66, which spring serves to normally close the butterfly valve or throttle valve 14. Of course, when valve 14 is closed, this limits clockwise movement of shaft 57 and crank arm 56 in Figure 3.

In order to restrain actuation of the brake lever 33; that is, counterclockwise movement thereof in Figures 1 and 5, until it is subjected to a predetermined amount of pressure, the curved lower portion of the brake lever 33 is provided with an arcuate cam surface or recess 67 which is normally engaged by a follower or roller 70 mounted on one end of a restraining lever 71.

The restraining lever 71 is oscillatably mounted intermediate its ends, as at 72, on the frame 21 and its end remote from the roller or follower 71 has one end of a tension spring 73 connected thereto. The other end of the tension spring 73 is connected to the lateral portion of a substantially L-shaped bracket 74 also carried by the frame 21.

In order to limit upward movement of the roller or follower 70 when the roller 70 is in engagement with the recess 67 in the brake lever 33, the spring 73 urges the forward portion of the restraining lever 71 into engagement with an adjustable abutment 75 shown in the form of an adjustment screw in Figures 4 and 5. The adjustment screw 75 threadably penetrates a plate 76 suitably secured to the frame 21 and is locked in adjusted position by means of a lock nut 77. Thus, when the restraining lever 71 occupies the position shown in Figures 1 and 5, it releasably maintains the brake lever 33 in inoperative position.

It is apparent that, upon depression of the front or upper end of the pedal 42, although some pressure may be exerted on the central portion of the pedal 42, the brake lever 33 is maintained in the inoperative position shown in Figures 1, 3 and 5 and the pedal 42 causes the lever 53 (Figure 3) to move in a counterclockwise direction. The length of the pliable element 55 is such that, when the brake lever 33 occupies inoperative position and the pedal 42 is not depressed, and the throttle lever 16 is also in closed position, the pliable element 55 is taut between the lever 53 and the crank arm 56.

Thus, counterclockwise movement of the lever 53 effects corresponding movement to the crank arm 56, shaft 57, crank arm 62, link 65 and throttle lever 16 to thereby control the flow of fuel to the engine 13.

Of course, when the operator releases pressure on the foot-pedal 42 the torsion spring 63 and the tension spring 66 move the throttle to substantially closed or idling position, since the spring 66 urges the throttle lever 16 in a counterclockwise direction in Figure 1 and the torsion spring 63 urges the crank arm 56 in a clockwise direction in Figure 3. Since the crank arm 56 is normally urged in a clockwise direction, the link 51 is normally urged outwardly and the foot-pedal 42 is normally urged in a clockwise direction into engagement with the abutment 44 as shown in Figure 1.

Now, any time that it is desired that the brakes be applied, the operator applies slightly greater than normal pressure to the medial or lower portion of the foot pedal 42, sufficiently to overcome the resistance offered by the restraining lever 71 and roller 70, to cause the brake lever 33 to move forwardly or in a counterclockwise direction from the position shown in Figure 5 to, say, the position shown in Figure 4. In so doing, the angle bracket 40 moves with the upper end of the brake lever 33 and, since both the upper and lower portions of the foot-pedal 42 are moved forwardly or inwardly in unison, the lever 53 (Figure 3) does not pivot relative to the bracket 40, but instead, moves forwardly and downwardly therewith relative to the crank arm 56 thereby slackening the pliable element 55 so the throttle lever 16 either returns to idling position or remains in idling position if it had occupied this position at the time pressure was initially applied to the brake lever 33 sufficiently to overcome the restraining means 70 and 71 as shown in Figure 4.

It is apparent that the pedal 42 may be tilted forwardly sufficiently to tighten the pliable element 55 and to partially open the throttle valve 14, although the brake lever 33 may be depressed sufficiently to apply the brakes or to cause the roller 70 to move out of engagement with the recess 67. Operation of the improved fuel and brake controls in this manner may be desirable when the automotive vehicle is stopped momentarily on an upgrade and will serve to prevent the vehicle from coasting backward. The fuel and brake controls will serve in this capacity with equal facility in vehicles equipped with either conventional gear type power transmissions or so-called fluid automatic power transmissions such as Dynaflow,[1] Hydra-Matic,[1] Fluid Drive,[1] Ultra-Matic,[1] Fordomatic,[1] etc.

It is thus seen that I have provided improved fuel and brake controls for automotive vehicles wherein the throttle may be controlled by the application of normal pressures to the forward portion of the foot-pedal 42 and wherein the operator may immediately apply the brakes by merely exerting slightly additional pressure on the lower or medial portion of the foot-pedal 42 and which will automatically release or override the pressure applied to the throttle and permit the throttle lever 16 to return to idling position.

In the drawings and specification there has been set forth a preferred embodiment of the invention and, although specific terms are employed, they are used in a generic and descriptive sense only and not for purposes

[1] Reg. T. M.

of limitation, the scope of the invention being defined in the claims.

I claim:

1. In combined throttle and brake controls for automotive vehicles having a brake pedal lever, a throttle link, a single foot-pedal pivotally connected to the throttle link and pivotally supported on the brake pedal lever, an engine and a throttle valve for controlling admission of fuel to the engine; the combination of a movable member spaced forwardly of the throttle link, mechanical connections between said movable member and said throttle valve, resilient means urging the throttle valve to idling position and also urging the movable member toward but in spaced relation to the throttle link, a second lever pivotally supported on said brake pedal lever and to one end of which the throttle link is pivotally connected, a normally taut pliable element connected to the other end of the second lever, said pliable element also being connected to said movable member, means releasably restraining actuation of the brake pedal lever, and said last-named means being releasable to permit actuation of the brake pedal lever in response to predetermined forward pressure applied to the foot-pedal whereby the pliable element may be slackened when the brake pedal lever is actuated.

2. In a structure according to claim 1, said means releasably restraining actuation of the brake pedal lever including a curved portion on the lower portion of said brake pedal lever and having an arcuate recess in its front surface, a follower normally seated in said recess, an arm supporting said follower, means pivotally supporting said arm at a point spaced forwardly from said recess, second resilient means urging the arm upwardly, and means restricting upward movement of said arm whereby, when said predetermined forward pressure is applied, the follower is forced downwardly out of said recess to release said brake pedal lever.

3. Improved combined throttle and brake controls for vehicles of the type having an engine, a throttle valve controlling the admission of fuel to the engine, and braking means for the vehicle including a brake lever having a rearward extension thereon; said combined throttle and brake controls comprising a single foot-pedal pivotally connected intermediate its ends to the rear end of said rearward extension, releasable means normally restraining actuation of said brake lever under predetermined pressure, a second lever pivotally supported by said second brake lever, a first link pivotally connecting one end of said second lever to the said foot-pedal in spaced relation to the rearward extension, a shaft oscillatably supported adjacent and forwardly of said brake lever and having at least one crank arm thereon spaced forwardly of the end of said second lever remote from that end to which the first link is connected, a pliable element normally taut between and connected to corresponding ends of the crank arm and said second lever, resilient means normally urging the crank arm away from the corresponding end of said second lever, mechanical connections between said shaft and said throttle valve, and the direction in which said resilient means normally urges said crank arm being such as to normally hold the throttle valve in idling position whereby depressing said foot-pedal will actuate said throttle valve and whereby, upon a predetermined amount of pressure being exerted on said foot-pedal, said brake lever will be released from the restraining means and its movement toward the crank will slacken the pliable element to permit said throttle to return to idling position although the first link is moved forwardly with actuation of the brake lever.

4. In a structure according to claim 3, said releasable means comprising an arm pivotally supported on said vehicle at a point spaced forwardly of said brake lever, said brake lever having a cam surface on its front surface, a follower on said arm normally engaging said cam surface, spring means normally urging the arm upwardly to seat the follower against the cam surface, means limiting upward movement of the arm, and said cam surface being so arranged whereby said predetermined pressure, when applied to said foot-pedal, will force the follower downwardly thereby releasing the brake lever.

5. Improved combined throttle and brake controls for vehicles of the type having an engine, a throttle valve controlling the admission of fuel to the engine, a floor board, braking means for the vehicle including a brake lever having a rearward extension loosely penetrating the floor board; said combined throttle and brake controls comprising a single foot-pedal pivotally connected intermediate its ends to the rear end of said rearward extension for movement about a substantially horizontal axis, releasable means normally restraining actuation of said brake lever under predetermined pressure, a second lever pivotally supported by said brake lever, a first link pivotally connected to one end of said second lever at one end thereof and also being pivotally connected to the upper portion of said foot-pedal, a shaft oscillatably supported adjacent and forwardly of said foot board and having at least one crank arm thereon spaced forwardly of the end of said second lever remote from that end to which the first link is connected, a pliable element normally taut between and connected to corresponding ends of the crank arm and said second lever, resilient means normally urging the crank arm away from the corresponding end of said second lever, mechanical connections between said shaft and said throttle valve, and the direction in which said resilient means normally urges said crank arm being such as to normally substantially close the throttle valve whereby depressing the upper portion of said pedal will open said throttle valve and whereby, upon a predetermined amount of pressure being exerted on the medial portion of said pedal, said brake lever will be released from the restraining means and its movement toward the crank arm will slacken the pliable element to permit said throttle to close although the first link is moved forwardly with actuation of the brake lever.

6. In an automotive vehicle having an engine, a throttle valve controlling admission of fuel to the engine and braking means including a brake pedal lever; combined throttle and brake controls comprising a foot-pedal pivotally connected adjacent one of its ends to said brake pedal lever, means releasably restraining actuation of said brake pedal lever, said last-named means being releasable to permit actuation of the brake pedal lever in response to a given amount of pressure being applied to the foot-pedal to actuate said braking means, and means selectively operable throughout the length of stroke of said brake pedal lever to selectively control the admission of fuel to the engine as the braking means are actuated.

7. In an automotive vehicle having an engine, a throttle valve controlling admission of fuel to the engine and braking means including a brake pedal lever; combined throttle and brake controls comprising a foot-pedal pivotally connected adjacent one of its ends to said brake pedal lever, a throttle link connected to the foot-pedal in spaced relation to the brake pedal lever, means releasably restraining actuation of said brake pedal lever said last-named means being releasable to permit actuation of said brake pedal lever in response to a given amount of pressure being applied to the foot-pedal, means responsive to movement of said foot-pedal by less than said given amount of pressure to open the throttle valve beyond idling position, means to override said last-named means by returning the throttle valve to idling position upon said given amount of pressure being applied to the foot-pedal to actuate the braking means, and means responsive to tilting said foot-pedal relative to the brake pedal lever regardless of the amount of pressure applied to the foot-pedal to deactivate the overriding means and permit the throttle valve to be opened as the brakes are applied.

8. In an automotive vehicle having an engine, a throttle valve controlling admission of fuel to the engine, means tending to move the throttle valve toward closed position and braking means including a brake pedal lever; combined throttle and brake controls comprising a foot-pedal pivotally connected adjacent one of its ends to said brake pedal lever, means releasably restraining actuation of said brake pedal lever, said last-named means being releasable to permit actuation of the brake pedal lever in response to a given amount of pressure being applied to the foot-pedal, means operatively connecting said foot-pedal to said valve, said last-named means including means for permitting said valve to be moved toward closed position by said first-named means, in the instance of the valve having been opened beyond idling position, while the relationship between the brake lever and the foot-pedal remains substantially constant during actuation of the brake lever.

References Cited in the file of this patent

UNITED STATES PATENTS

| | | |
|---|---|---|
| 1,230,426 | Murray | June 19, 1917 |
| 1,910,412 | Staude | May 23, 1933 |
| 2,352,104 | Kennedy | June 20, 1944 |
| 2,411,167 | Perry | Nov. 19, 1946 |
| 2,542,410 | Hedges | Feb. 20, 1951 |
| 2,730,214 | Scott | Jan. 10, 1956 |